United States Patent [19]

Yalamanchili et al.

[11] Patent Number: 4,853,032

[45] Date of Patent: Aug. 1, 1989

[54] PROCESS FOR PRODUCING LOW CARBON STEEL FOR COLD DRAWING

[75] Inventors: Bhaskar Yalamanchili; Frank Wisniewski; Thad Boudreaux, all of Beaumont, Tex.

[73] Assignee: Cargill, Incorporated, Minneapolis, Minn.

[21] Appl. No.: 86,407

[22] Filed: Aug. 17, 1987

[51] Int. Cl.<sup>4</sup> .......................... C21C 7/00; C22B 4/00
[52] U.S. Cl. .................. 75/10.49; 75/10.60; 75/53
[58] Field of Search ...................... 75/53, 10.49, 10.60

[56] References Cited

U.S. PATENT DOCUMENTS 3,809,547  5/1974  Lewis .................... 75/53

OTHER PUBLICATIONS

Morgan & Shyne, "Control of Strain Aging in Alpha-Iron", Journal of Metals, pp. 65–69 (Jan. 1957).
Darby & Beck, "Sigma–Phase in Certain Ternary Systems with Vanadium", Journal of Metals, pp. 69–71 (Jan. 1959).
Morgan & Shyne, "Preparation of Boron Treated Nonaging Open Hearth Steel", Trans. Aime, pp. 784–785 (Jun. 1957).
Morgan & Shyne, "The Strain Ageing of Boron-- Treated Low–Carbon Steels", J. Iron & Steel Institute, pp. 156–160 (Feb. 1957).

*Primary Examiner*—Peter D. Rosenberg
*Attorney, Agent, or Firm*—Fitch, Even, Tabin & Flannery

[57] ABSTRACT

An improved process is provided for the manufacture of low carbon steel from scrap in electric arc furnaces with continuous casting. The improvement comprises establishing a B:N ratio in the range of 0.8 to 1.5 and preferably in the range of 0.9 to 1.4 to reduce the tensile strength of the steel and avoid hot shortness. The low carbon steel has improved cold drawing characteristics with desired yields, tensile strengths and work hardening rates particularly for manufacture of nails, staples, hangers and the like.

6 Claims, 1 Drawing Sheet

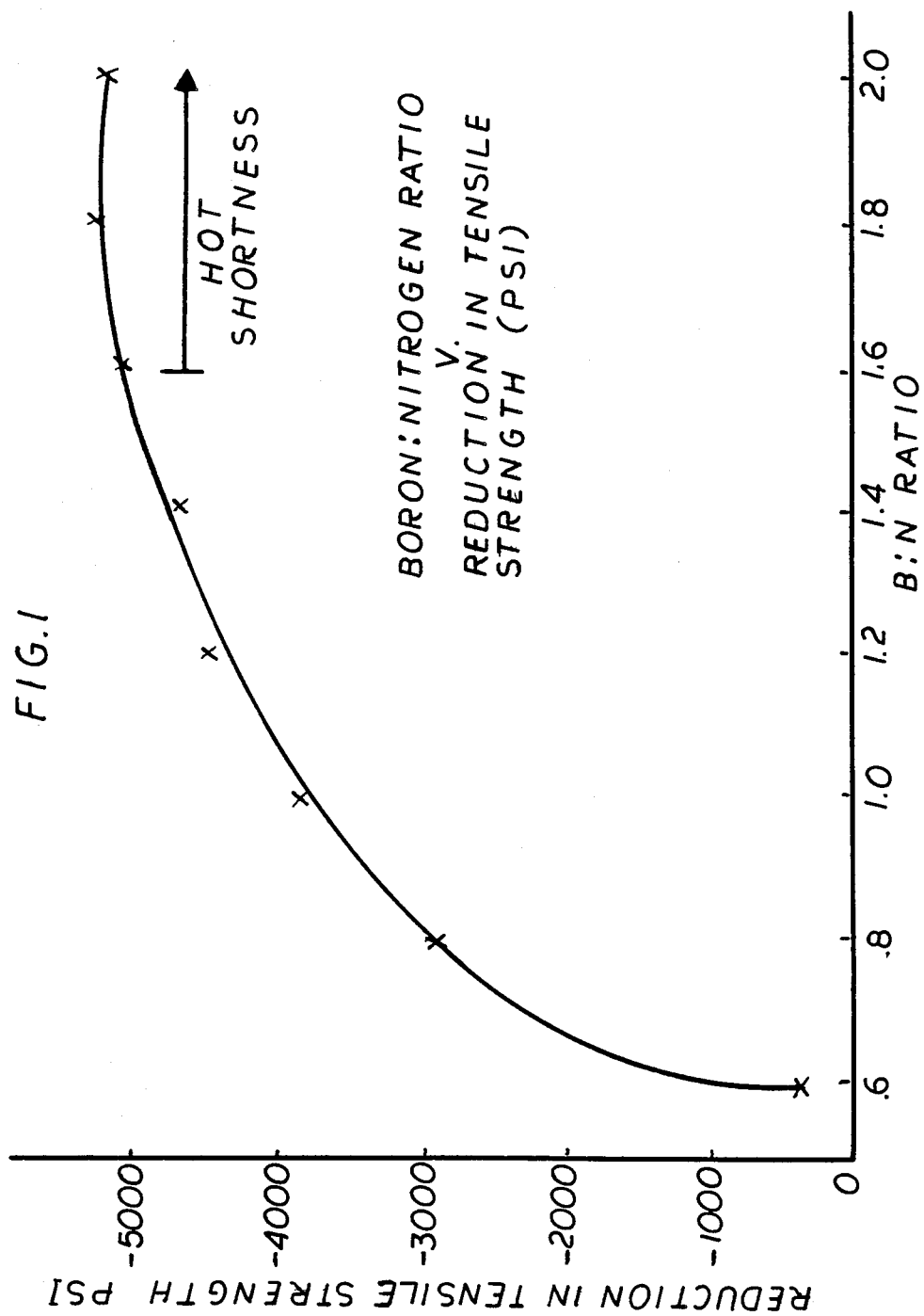

PROCESS FOR PRODUCING LOW CARBON STEEL FOR COLD DRAWING

BACKGROUND OF INVENTION

1. Field of Invention

The present invention relates generally to an improved process for producing low carbon steels for cold drawing, and more particularly relates to an improved process for producing low carbon steels with reduced tensile strengths and without hot shortness.

2. Description of Prior Art

It has been industry practice to produce low to medium carbon rim steel for use in the production of various wire products. The characteristics of such rim steel, such as the tensile properties, ductility and work hardening rates are well known, as well as their relation to steel chemistry and metallurgy. Furthermore, the use of rim steel for cold drawing of wire has been highly satisfactory.

However, low to medium carbon rim steel is costly to produce when compared to the use of electric arc furnaces when combined with continuous casting. Rim steel cannot be produced by use of electric arc furnaces with continuous casting since the continuously cast steel must be killed. Further, since electric arc furnaces typically use cold scrap as the charge material resulting in steel containing higher amounts of residual elements, such as Cu, Ni, Cr, Mo, Sn and N, the resulting steel on cold drawing has higher tensile strengths, lower ductility and higher work hardening rates than occur with respect to rim steel. Nevertheless, the economic advantages of use of electric arc furnaces with continuous casting has placed pressure on the industry to overcome the process deficiencies and various approaches have been undertaken to gain improvement by considering all stages of the process from melting through wire drawing. Mainly, the approach has been through chemistry changes since the mechanical properties of steel are primarily dependent upon its composition. One such approach is disclosed in Letters U.S. Pat. No. 4,168,181 to Perlus, et al and issued Sept. 18, 1979. This patent discloses a method for making wire by cold working rod made from continuously cast silicon-killed boron steel in an electric furnace from a charge of essentially 100 percent cold scrap. The disclosure is directed to using less than 0.90 percent by weight of residuals and less than 0.02 percent boron in the heat in the electric furnace. However, there is no teaching of achieving higher reduction in tensile strengths or of such reductions in tensile strength with improved ductility and lower work hardening rates. Further, there is no disclosure of any effect of nitrogen in the method.

The literature abounds with papers describing the effects of nitrogen in varying concentrations on steel, and low carbon steel in particular due to its widespread use. Past efforts to control these effects have concentrated on methods to reduce the amount of nitrogen contained, as well as seeking to modify or neutralize its effect through combining it with aluminum or vanadium. Unfortunately these methods have their own adverse consequences. Significant lowering of nitrogen content can only be achieved by very costly methods which are only partially successful. Microalloying with vanadium increases tensile strength, while use of aluminum not only increases tensile strength, but also leads to difficulties in casting and in wire drawing.

Further, the literature discloses the combination of boron and nitrogen to form boron nitride, and since boron nitride tends to precipitate at austenite grain boundaries rather than in ferrite, it was believed that the nitrogen content of steel could be effectively neutralized by microalloying with boron.

However, there has been no teaching of the critical effect of the ratios of boron to nitrogen, i.e. B:N, upon the mechanical properties of steel made from scrap in an electric arc furnace followed by kill and continuous casting.

The use of heretofore available steel from an electric arc furnace and continuous casting has resulted in difficulties in the cold drawing of such steels and imperfections in their use for fencing, nails, staples, etc.

OBJECTS

It is a principal object of the invention to provide an improved process for the manufacture of low carbon steels for cold drawing.

It is another object of the invention to provide an improved process for the manufacture of low carbon steel for the cold drawing of wire.

It is still another object of the invention to provide an improved process for the manufacture of low carbon steel with substantially reduced tensile strengths and without hot shortness.

The accomplishment of these and other objects of the invention are set forth in the following description and accompanying drawing.

DRAWING

FIG. 1 is a graph which plots the relationship between the B:N ratio and reduction in tensile strength in a low carbon and shows the criticality of the B:N ratio.

SUMMARY OF INVENTION

It has been found that highly improved low carbon steels (meaning steels having carbon levels below about 0.22 percent) can be manufactured with the use of scrap in electric arc furnaces and with continuous casters by carefully controlling the ratio of weight percent boron to weight percent of nitrogen in the range of about 0.80 to 1.5, and preferably in the range of about 0.9 to 1.4, so as to reduce the tensile strength from between about 3000 psi to about 5000 psi, below that which would obtain without boron addition. At B:N ratios below these ranges, mechanical properties of the steel are not significantly affected and at higher ratios, the billets were found to crack during rolling and exhibit hot shortness. The level of boron should be less than about 0.012 percent and the maximum level of nitrogen is about 0.01 percent, although the boron is preferably below 0.010% and the nitrogen below 0.008%. In order to achieve the desired B:N ratio in electric arc furnace operation, the furnace nitrogen percent is determined and boron is added as follows:

| FURNACE NITROGEN Wt. % | BORON RANGE Wt. % |
|---|---|
| .004 | .0055–.0075 |
| .005 | .0065–.0085 |
| .006 | .0075–.0095 |
| .007 | .0085–.0105 |

The scrap selection and melting of the heat should be such as to provide a chemistry in the below indicated range.

|   | Wt. %     |    | Wt. %    |
|---|-----------|----|----------|
| C | .03–.22   | Ni | .20 MAX  |
| Mn| .25–.60   | Cr | .20 MAX  |
| P | .025 MAX  | Mo | .030 MAX |
| S | .030 MAX  | Sn | .030 MAX |
| Si| .08 to .15| N  | .01 MAX  |
| Cu| .29 MAX   |    |          |

The chemistry should provide a steel having a strength below about 60,000 psi without addition of boron and, upon addition of boron, to provide a B:N ratio in the prescribed range, the tensile strength will be lowered between about 3000 psi and 5000 psi. The effect of the B:N ratio as a function of reduction in tensile strength is illustrated in FIG. 1 of the drawing.

The electric arc furnace is operated in accord with commercial mill practice using scrap which is selected to provide the chemistry as above described. The selection is further made to maintain residuals below 0.9 weight percent. The level of carbon is adjusted by blowing oxygen, as is well understood. The nitrogen level is determined after carbon blow, the tap temperature is adjusted, depending upon the level of carbon, and the heat is tapped into a ladle. During tapping, the steel is killed, i.e. deoxidized, by adding ferroalloys such as FeMn and FeSi. The ladle is stirred by introducing argon gas into the bottom of the ladle through a porous plug. At the ladle, the boron is mixed in the above specified amount to provide the necessary B:N ratio. Other chemistry adjustments may be made in the ladle. The steel is then poured into a tundish and then continuously cast into billets. The billets may then be rolled into wire rod, which in turn can be drawn into smooth surfaced wire.

Unless the desired B:N ratios are provided in the steel, the wire rods have high yield values, tensile strengths, work hardening rates or exhibit hot shortness in the rolling mill.

A heat was prepared having the following chemistry:

| C   | Mn  | P    | S    | Si  | Cu  | Ni  | Cr  | Mo   | Sn   | Al   | N    | B     | B:N |
|-----|-----|------|------|-----|-----|-----|-----|------|------|------|------|-------|-----|
| .05 | .38 | .009 | .022 | .16 | .16 | .07 | .03 | .013 | .010 | .001 | .010 | .0041 | .41 |

There was no significant reduction in tensile strength showing that the B:N ratio was not effective.

Another heat was prepared having the following chemistry:

| C   | Mn  | P    | S    | Si  | Cu  | Ni  | Cr  | Mo  | Sn   | Al   | N    | B     | B:N |
|-----|-----|------|------|-----|-----|-----|-----|-----|------|------|------|-------|-----|
| .04 | .40 | .007 | .022 | .10 | .14 | .08 | .02 | .13 | .011 | .003 | .007 | .0045 | .64 |

The tensile strength was reduced about 1300 psi which was insufficient to provide satisfactory mechanical properties.

As shown in FIG. 1, hot shortness billets resulted at B:N ratios above 1.6. To demonstrate this, two heats were run with the following chemistries.

| C   | MN  | P    | S    | Si  | Cu  | Ni  | Cr  | Mo   | Sn   | Al   | N    | B     | B:N  |
|-----|-----|------|------|-----|-----|-----|-----|------|------|------|------|-------|------|
| .04 | .36 | .013 | .030 | .08 | .17 | .07 | .05 | .012 | .015 | .001 | .006 | .0099 | 1.65 |
| .04 | .39 | .010 | .018 | .11 | .13 | .05 | .03 | .008 | .014 | .004 | .008 | .0133 | 1.66 |

The steels from these heats each had substantial reductions in tensile strength but rolling problems developed related to hot shortness. This hot shortness tends to cause surface defects which are harmful both upon cold drawing and hot rolling.

DESCRIPTION OF PREFERRED EMBODIMENTS

To demonstrate the preferred practice of the invention, scrap steel was introduced into an electric arc furnace and nitrogen was determined to be as indicated below, and boron was added at the ladle. Five heats were run with the following chemistries:

|    | C   | Mn  | P    | S    | Si  | Cu  | Ni  | Cr  | Mo   | Sn   | Al   | N    | B     | B:N  |
|----|-----|-----|------|------|-----|-----|-----|-----|------|------|------|------|-------|------|
| 1. | .05 | .41 | .009 | .024 | .15 | .15 | .08 | .04 | .011 | .012 | .006 | .007 | .0079 | 1.13 |
| 2. | .06 | .40 | .009 | .020 | .10 | .16 | .07 | .04 | .014 | .012 | .003 | .007 | .0064 | 0.91 |
| 3. | .04 | .43 | .008 | .033 | .11 | .14 | .07 | .03 | .012 | .010 | .002 | .007 | .0076 | 1.09 |
| 4. | .06 | .35 | .008 | .019 | .10 | .14 | .06 | .03 | .011 | .010 | .003 | .007 | .0082 | 1.17 |
| 5. | .04 | .36 | .009 | .019 | .10 | .15 | .08 | .03 | .013 | .011 | .002 | .008 | .0067 | 0.84 |

The mechanical properties of the respective heats were as follows:

|    | YIELD STRENGTH psi | TENSILE STRENGTH psi | EXPECTED TENSILE psi | REDUCTION OF TENSILE psi | REDUCTION OF AREA % |
|----|--------------------|----------------------|----------------------|--------------------------|---------------------|
| 1. | 38,850             | 55,600               | 59,600               | −4,000                   | 74                  |
| 2. | 37,450             | 54,800               | 59,200               | −4,400                   | 74                  |
| 3. | 37,700             | 54,800               | (N/A)                | (N/A)                    | 75                  |
| 4. | 37,750             | 54,500               | 58,100               | −3,600                   | 71                  |

-continued

|    | YIELD STRENGTH psi | TENSILE STRENGTH psi | EXPECTED TENSILE psi | REDUCTION OF TENSILE psi | REDUCTION OF AREA % |
|----|---|---|---|---|---|
| 5. | 36,400 | 53,250 | 58,100 | −5,350 | 73 |

The "expected tensile" is a calculated number which has been found to directly correlate with steel made without adjustment of the B:N ratio.

None of the five heats exhibited hot shortness upon rolling and the yields and tensile strengths provide desired mechanical characteristics for cold drawing and the manufacture of nails, staples, hangers, and the like. Further, upon drawing, the product had smooth surfaces.

Thus, it has been found that by tying up nitrogen through boron addition and establishing particular ratios of B:N, a highly improved low carbon steel can be routinely produced in electric arc furnaces with continuous casting.

The various features of the invention which are believed to be new as set forth in the following claims:

What is claimed is:

1. A process for the manufacture of low carbon steels in electric arc furnaces which comprises the steps of preparing a heat including scrap to provide a chemistry in the range:

| C | .03–.22 | Ni | .20 MAX |
|---|---|---|---|
| Mn | .25–.60 | Cr | .20 MAX |
| P | .025 MAX | Mo | .030 MAX |
| S | .030 MAX | Sn | .030 MAX |
| Si | .08 to .15 | N | .01 MAX |
| Cu | .29 MAX | | | adding boron to the heat in an amount to establish a B:N ratio of between about 0.8 and 1.5, and casting the heat.

2. A process for the manufacture of low carbon steels in accord with claim 1 wherein the added boron establishes a B:N ratio between about 0.9 and 1.4.

3. A process for the manufacture of low carbon steels in accord with claim 1 wherein the nitrogen is in the heat below about 0.01 percent.

4. A process for the manufacture of low carbon steels in accord with claim 3 wherein the boron in the heat is at a level below about 0.012 percent.

5. A process for the manufacture of low carbon steels in accord with claim 1 including killing the heat prior to casting.

6. A process for the manufacture of low carbon steels in accord with claim 1 wherein the heat is continuously cast.

* * * * *

UNITED STATES PATENT AND TRADEMARK OFFICE
CERTIFICATE OF CORRECTION

PATENT NO. : 4,853,032

DATED : August 1, 1989

INVENTOR(S) : Bhaskar Yalamanchili et al.

It is certified that error appears in the above-identified patent and that said Letters Patent is hereby corrected as shown below:

Face of Patent, column 2, lines 4 and 5, change "Aime" to --AIME--;

change "784" to --781--.

Column 4, line 33, change "MN" to --Mn--.

Column 5, line 28, change "as" to --are--.

Signed and Sealed this

Twenty-sixth Day of June, 1990

Attest:

HARRY F. MANBECK, JR.

*Attesting Officer*   Commissioner of Patents and Trademarks